US006226244B1

United States Patent
Timmermans et al.

(10) Patent No.: US 6,226,244 B1
(45) Date of Patent: *May 1, 2001

(54) PLAYBACK APPARATUS FOR A RECORD CARRIER PROVIDING PHYSICAL COPY PROTECTION

(75) Inventors: Jozef M. K. Timmermans, Hasselt (BE); Erik C. Schylander; Johannes J. Mons, both of Eindhoven (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/295,535

(22) Filed: Apr. 21, 1999

Related U.S. Application Data

(62) Division of application No. 08/980,131, filed on Nov. 26, 1997, now Pat. No. 5,930,210, which is a division of application No. 08/389,445, filed on Feb. 15, 1995, now Pat. No. 5,737,286, which is a continuation of application No. 07/983,901, filed on Dec. 1, 1992, now abandoned.

(30) Foreign Application Priority Data

Dec. 2, 1991 (EP) .................................................. 91203147

(51) Int. Cl.[7] .................................................. G11B 7/005
(52) U.S. Cl. .................................................. 369/48; 369/54
(58) Field of Search .............................. 369/44.13, 44.26, 369/44.39, 47–48, 53–54, 58, 100, 109, 111, 124, 275.3–275.4, 124.04, 124.07, 124.09; 360/133

(56) References Cited

U.S. PATENT DOCUMENTS

| 4,849,836 | * | 7/1989 | Kachikian | 360/133 X |
| 4,879,704 | * | 11/1989 | Takagi et al. | 369/48 X |
| 4,907,216 | * | 3/1990 | Rijnsburger | 369/44.39 |

(List continued on next page.)

FOREIGN PATENT DOCUMENTS

| 299573 | * | 1/1989 | (EP) . |
| 325330 | * | 7/1989 | (EP) . |
| 1516285 | * | 7/1978 | (GB) . |

OTHER PUBLICATIONS

Patent Abstracts of Japan, vol. 10, No. 312, (p. 509), (2368), Oct. 23, 1986, for JP 61–123026.*

*Primary Examiner*—W. R. Young
(74) *Attorney, Agent, or Firm*—Leroy Eason

(57) ABSTRACT

Playback apparatus for a record carrier on which information is recorded in the form of variations of a first physical parameter. The playback apparatus scans the record carrier by means of a transducer which is responsive to the variations of the first physical parameter. An information recovery circuit recovers the information from a detection signal produced by the transducer. The record carrier also exhibits a variation of a second physical parameter, which differs from the first physical parameter but is of a type which is detectable by the same transducer. A detection circuit detects the presence of the second variation on the basis of a further detection signal produced by the transducer. A circuit controlled by the detection circuit enables the information recovery circuit in the event that the presence of the second variations is detected. Since copying recorders of the usual type only copy variations of the first physical parameter, representing the recorded information, and do not copy variations of the second physical parameter, such copiers cannot copy the information recorded on the described record carrier.

6 Claims, 3 Drawing Sheets

U.S. PATENT DOCUMENTS

| | | | |
|---|---|---|---|
| 4,975,898 | * 12/1990 | Yoshida | 369/100 |
| 5,060,219 | * 10/1991 | Lokhoff et al. | 369/48 |
| 5,737,286 | * 4/1998 | Timmermans et al. | 369/44.13 |
| 5,930,210 | * 7/1999 | Timmermans et al. | 369/44.13 |

* cited by examiner

PLAYBACK APPARATUS FOR A RECORD CARRIER PROVIDING PHYSICAL COPY PROTECTION

CROSS REFERENCE TO RELATED APPLICATIONS

This is a divisional of application Ser. No. 08/980,131, filed Nov. 26, 1997, which issued as U.S. Pat.No. 5,930,210, which is a divisional of application Ser. No. 08/389,445, filed Feb. 15, 1995, which issued as U.S. Pat. No. 5,737,286 on Apr. 7, 1998, and which is a continuation of application Ser. No. 07/983,901, filed Dec. 1, 1992, now abandoned.

BACKGROUND OF THE INVENTION

1. Field of the Invention

The invention relates to an information system comprising a record carrier on which information has been recorded in the form of variations of a first physical parameter and a playback apparatus provided with means for scanning the record carrier by means of a transducer which is responsive to said variations of said first physical parameter and, means for recovering the information from a detection signal received from said transducer.

The invention further relates to a record carrier and a play-back apparatus for use in the system.

2. Description of the Related Art

A system of the type mentioned above is inter alia known as the Compact-Disc system. Normal Compact Discs play on all compatible playback apparatuses. Nowadays recording apparatus are available for copying the information present on a read-only Compact Disc on a recordable disc which can be played on the compatible play-back apparatus.

However some applications for example audio-visual games, require a so-called "closed system" in which the Compact Disc with the software representing the audio-visual game can only be played on special players and which cannot be copied easily by means of the available recording apparatuses.

In view of costprice aspects it is desired that know-how of already existing information systems can be used as much as possible. Therefor it is desired to modify existing information systems as little as possible in order to realize a low-cost "closed information system".

However it should be made very difficult for third parties to copy such special discs by means of existing copying machines. The prior art protection schemes do not meet this requirement, e.g.

- rate scrambling/encryption can by copied from disc to disc with a bit copying machine;
- special logical errors (to copy protect) in a main and/or subcode channel (of e.g. a Compact Disc) can also be copied with a bit copying machine;
- schemes relying on the relation main/subcode channel can also be copied with a bit copying machine.

SUMMARY OF THE INVENTION

An object of the invention is to provide a closed information system in which record carriers are used which cannot easily be copied less easily.

According to the invention this object is achieved by an information system as described in the opening paragraph and which is characterized in that said record carrier exhibits a second variation of a second physical parameter, which differs from said first physical parameter but is detectable by said transducer. The playing apparatus comprises detection means for detection of the presence of said second variation on the basis of a detection signal received from the transducer and, means responsive to the detection means for enabling recovery of the information in the event that the presence of said second variations is detected.

Due to the fact that a bit copying machine usually only copies the variations of the first physical parameter (which variations represent the information recorded) the variations in the second physical parameter are not copied. Consequently the special discs cannot be copied by the usual type of bit copying machines.

An embodiment of the information system is characterized in that the second variation exhibits a modulation pattern representing a code, the detection means comprises code recovery means for recovering said code from the detection signal and also comprises means for activating the enabling means in response to the recovery of said code.

The use of a modulation of the variation has the advantage that the presence of the variation of the second physical parameter can be detected more reliably.

A further embodiment of the information system is characterized in that the information recorded is of a type which is recoverable by means of a predetermined data processing, the code represented by the modulation pattern of the second variation indicates the type of data processing to be used for recovering the information, the apparatus is provided with means for setting the recovery means in a mode in which the recovered predetermined data processing indicated by the code is performed.

This embodiment has the advantage that for recovering the information read from the record carrier it is required that the code represented by the modulation pattern is available. So the information can only be recovered by a dedicated play back apparatus, which is able to recover the code. In the event that the information is encrypted or scrambled before it is recorded on the record carrier the code preferably indicate the encryption key or the scramble method respectively.

Although not limited to information systems in which optically readable record carriers are used, the system is in particular suitable for this type of information systems.

In an optical record carrier it is relatively simple to provide the track in which the information has been recorded with a further track modulation which can be detected by the same radiation beam as used for reading the information.

An embodiment of the information system in which this is realized, is characterized by servo control means for controlling the scanning in order to control at least one scanning parameter to a predetermined value on the basis of a detection signal received from the radiation sensitive detector and which is affected by said second physical parameter, which servo control means has a predetermined frequency bandwidth. The variation of said second physical parameter causes variations in the detection signal which exhibit a frequency spectrum which is located outside the bandwidth of the servo control means and outside the frequency spectrum of the signal variations caused by the variation of the first physical parameter.

The variations in the second physical parameter can be in the form of a variation in the track position in a direction transverse to the track direction. This variation can be detected on the basis of the tracking error signal.

The variations in the second physical parameter can be in the form of a variation in the position of the plane in which the optically readable marks are located. In that event the variation can be detected on the basis of the focus error signal.

The variations in the second physical parameter can also be in the form of a variation in the mean value of the optically readable marks and the intermediate areas located between the optically readable marks. In that event the variations in the second physical parameter can be detected on the basis of variations in the data clock signal which is recovered during the scanning of the track with a constant linear velocity.

In the event that the record carrier used in the information system is a Compact Disc it is preferred to use an information system which is characterized in that the variations in the second physical parameter result in a variation in the detection signal with a frequency substantially corresponding to 22 kHz in the event that the track is scanned with a scanning speed between 1.2 to 1.4 meter per second.

This embodiment has the advantage that it is impossible to copy the special disc on the an usual recordable Compact Disc, which has a pregroove which exhibits a wobble which results in a tracking error with a frequency of substantial 22 kHz when the pregroove is scanned with a velocity between 1.2 and 1.4 meter per second.

Even in the event that it is possible to record a wobbling pattern of recording marks which corresponds to the wobbling recording marks of the record carrier to be copied, this pattern will not be detectable because of the presence of the wobbling pregroove which is situated in the same frequency range.

BRIEF DESCRIPTION OF THE DRAWINGS

Embodiments of the invention will now be described in more detail, by way of example, with reference to FIGS. 1 to 9, wherein.

DESCRIPTION OF THE PREFERRED EMBODIMENTS

Figure 4:
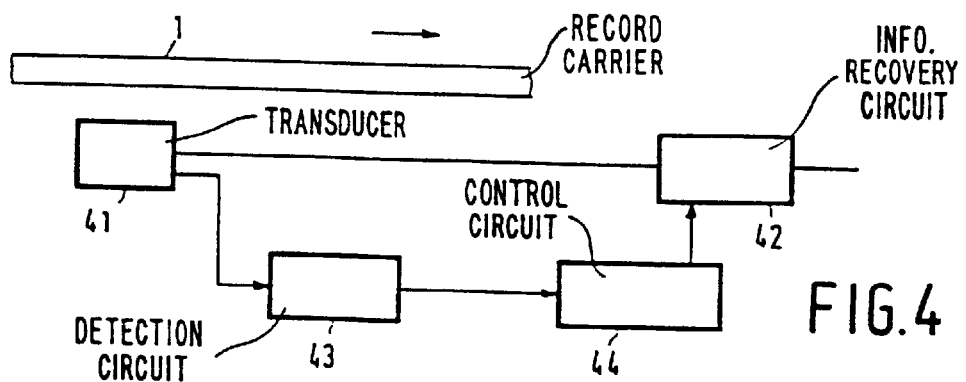
FIGS. 4 and 5 show embodiments of an information system according to the invention, FIG. 6 show the positions of the frequency spectra of different signals with respect to one another.

FIG. 4 shows an embodiment of an information system in accordance of the invention. The information system comprises means (not shown) to move a record carrier 1 relative to a transducer 41, so as to cause a scanning of the record carrier 1. The record carrier exhibits variations of a first physical parameter, which variations represent information recorded on the record carrier 1. The transducer 41 is of a type that is responsive to said variations in said first physical parameter. An information recovery circuit 42 is coupled to an output of the transducer 41 for receiving a detection signal corresponding with the variations of the first physical parameter on the scanned part of the record carrier. The information recovery circuit is of an usual type that recovers the information from the said detection signal.

The record carrier 1 further exhibits a variation of a second physical parameter, which does not represent the information represented by the variations of the first physical parameters. The second variations, however, are also detectable by the transducer 41. The transducer supplies to a detection circuit 43 a signal corresponding with the variations in the second physical parameters detected by the transducer 41. The detection circuit 43 supplies to a control circuit 44 a control signal indicating whether the detection signal received from transducer 41 comprises signal parts which corresponds with predetermined variations of the second physical parameter. In response to the receipt of a control signal indicating that the detection signal does comprise signal parts corresponding to said predetermined variations the control circuit 44 supplies to the information recovery circuit 42 an enabling it to carry out signal for enabling the information recovery. So only in the event that the presence of said variation in said second physical parameter is detected will the information recorded on the disc will be recovered. The information recorded on a copy of the record carrier, which copy only exhibits the variations in the first physical parameter, representing the information, cannot be recovered.

Figure 1A:
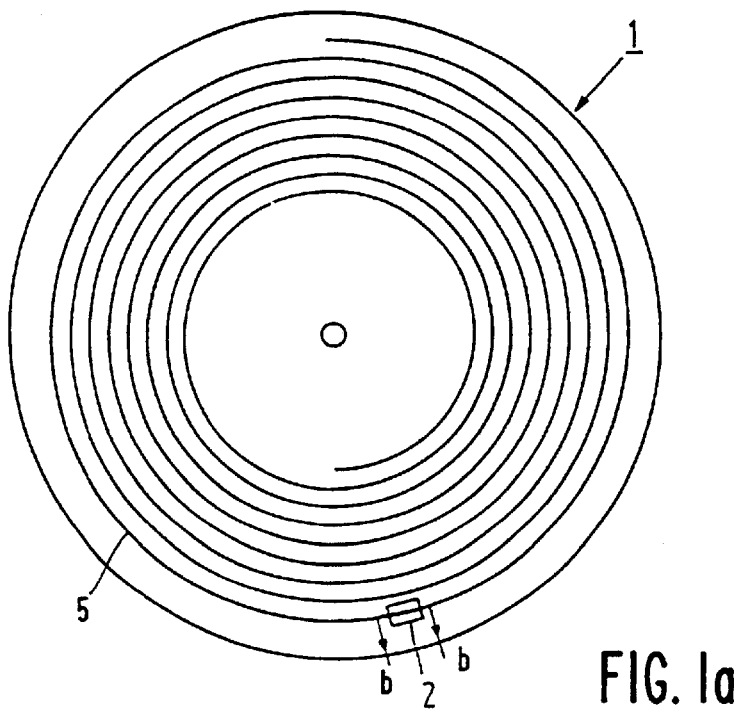
FIGS. 1a, 1b, 1c, 1d, 2 and 3 show embodiments of record carriers for use in the information system according to the invention.
Figure 1B:
Figure 1C:
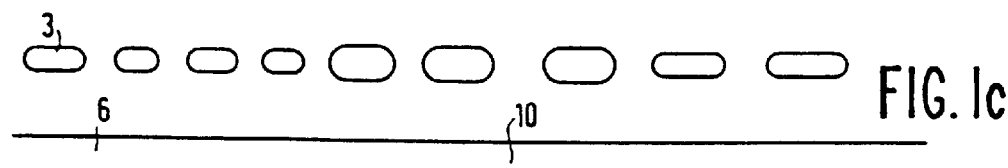
Figure 1D:
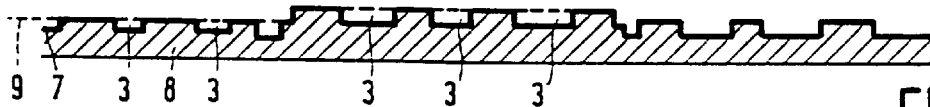

FIG. 1a, 1b, 1c, 1d show possible embodiments of a record carrier 1 for use in the information system in accordance with the invention, FIG. 1a being a plan view, FIG. 1b and 1c being highly enlarged plan views of a part 2 of a first and second embodiment of the record carrier 1, and FIG. 1d showing a small part of a sectional view of the part 2 along a line b—b of a third embodiment of the record carrier 1.

In the embodiment of the record carrier 1 shown in FIG. 1b the variations in first physical parameters have the form of optical detectable marks 3 which alternate with intermediate areas 4. The optically detectable marks may be in the form of so-called pits. However also other type of optically detectable marks are suitable. The optically detectable marks are arranged along a track of which the centre line is indicated by the reference numeral 5. In this embodiment the variation in the second physical parameter is a variation of the track position in a direction transverse to the track direction. This position variation has the form of a track undulation, also known as a radial track wobble. Such track wobble can easily be detected by the same beam scanning means as used for the detection of the optically detectable marks 3 as will be discussed in an other part of the description.

In the embodiment shown in Figure 1c the variations of the second physical parameter has the form of variations of the width of the optical detectable marks 3. The variations in the width of marks 3 result in a additional intensity modulation in a radiation beam scanning the track. Both the variations in the width of the marks 3 and the information can be recovered on the basis of the intensity modulation, provided that the frequency spectrum of the component caused by the pattern of marks does not overlap the frequency spectrum of the component caused by the mark width variations.

In FIG. 1d the reference numeral 6 indicates a transparent substrate. The substrate 6 is covered with a reflective layer 7. The reflective layer 7 is covered by a protective layer 8. The substrate 6 is provided with optically detectable marks 3 in the form of pits. The variation in the second parameter are in the form of the variations of the position of the plane in which optically detectable marks 3 are situated. In FIG. 1d different positions of these planes are indicated by lines 9 and 10. When scanning the pattern as shown in FIG. 1d with a focused radiation beam the variations in the plane of the marks 3 result in a focus error which can be detected easily.

Figure 2:
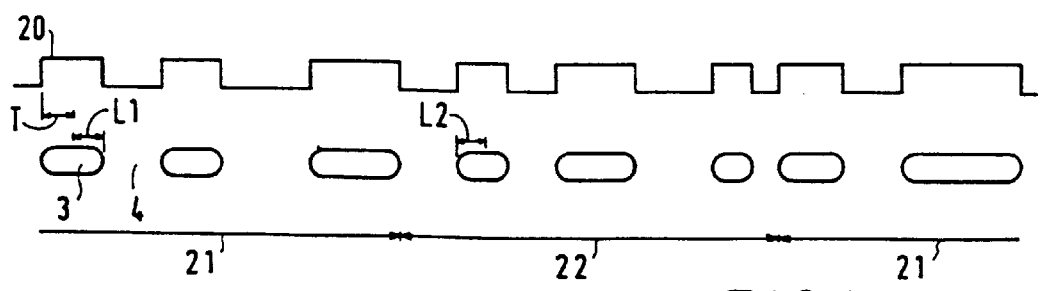

FIG. 2 shows the pattern of optically marks 3 and intermediate areas 4 for a fourth embodiment of the record carrier 1 in use in an information system according to the invention. The lengths of the marks 3 and the intermediate areas 4 correspond with a plurality (including one) of bit cells of a signal 20 read from the record carrier. In FIG. 2 this signal 20 is shown for the event that the pattern of marks 3 and areas 4 is scanned with a constant linear velocity. The length T of a bit cell corresponds with the period T of the data clock of the signal. In the track parts indicated by reference numeral 21 a bit cell is represented by a track part with a length L1, whilst in the track part indicated by reference numeral 22 a bit cell is represented by a track part with a length L2, which is shorter than length L1. In other words the mean length of the marks 3 and areas 4 for the track parts 21 differs from the mean length of the marks 3 and areas 4 in the track parts 22. In the event that the track is scanned with a constant linear velocity and the data clock is recovered from the signal 20 read, the variation in the mean value of the length of the marks 3 and areas 4 results in a variation of the frequency of the recovered data clock.

Figure 3:
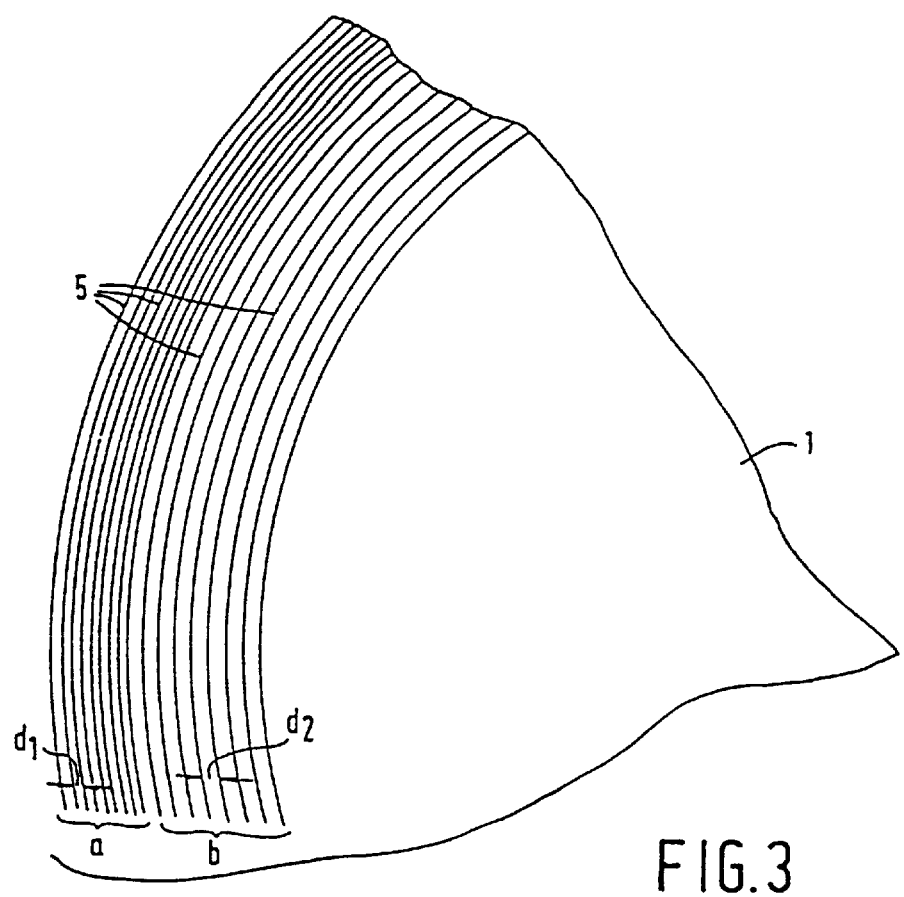

FIG. 3 shows a fifth embodiment of a record carrier for use in the information system according to the invention. In this embodiment the tracks are divided in groups a and b. The track pitch d1 in group a as well as the track pitch d2 of the tracks in group b is constant within the respective group. The track pitch d2, however, is greater than the track pitch d1. This difference in track pitch can be easily detected when the tracks are scanned by a radiation beam as is described in detail in GB-PS 1,516,285 which document is hereby incorporated in the description by reference. The presence of the variations in the track pitch can be easily detected when a scanning beam is moved in radial direction over the record carrier 1.

Figure 5:
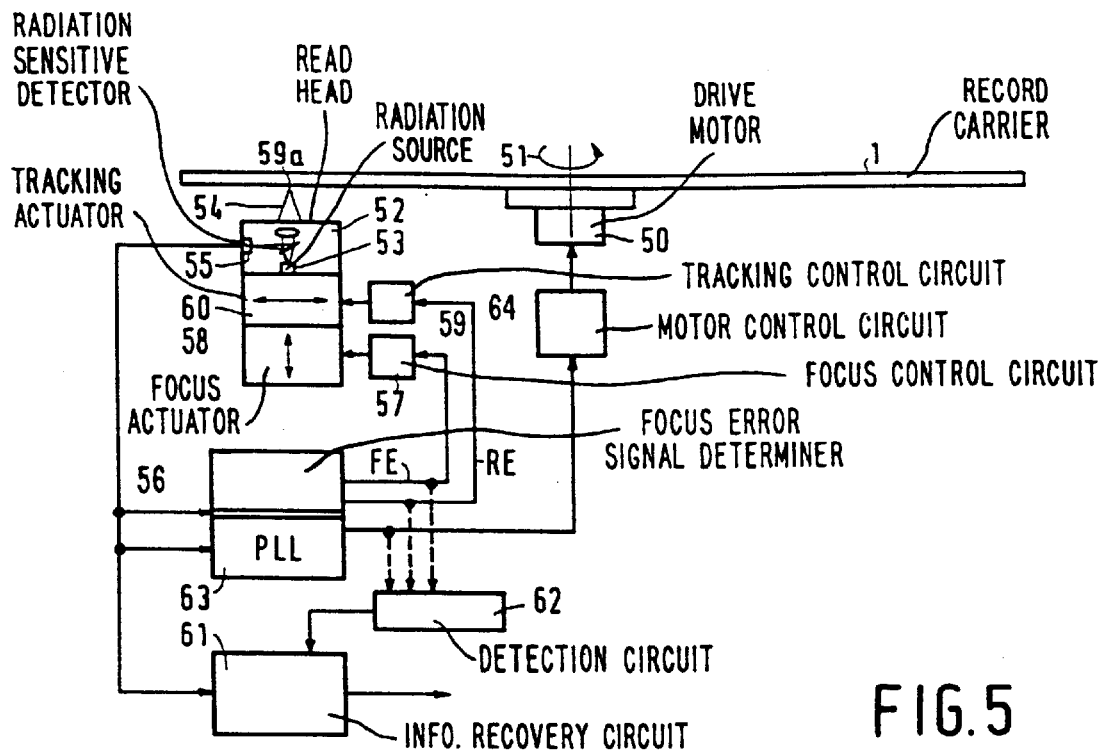

FIG. 5 shows an embodiment of an optical information system in accordance with the invention in more detail.

The system is provided with a rotating drive motor 50 mechanically coupled with the record carrier 1 so as to cause a rotation of the record carrier about an axis 51. In doing so the record carrier is moved relative to a transducer in the form of an optical read head 52 of an usual type. The optical head 52 comprises a radiation source 53 for example in the form of a semiconductor laser for generating a laser beam 54. The beam 54 is directed by an optical system of an usual type to a radiation sensitive detector 55 via the record carrier 1. The laser beam is modulated in accordance with the variations of the first and second parameter. These modulations are detected by the detector 55 and detection signals corresponding to these modulations are available on output of the detector 55. The detection signals on the output of the detector 55 are supplied to a circuit 56 of a usual type which derives a focus error signal FE and an tracking error signal RE from these detection signals. The focus error signal FE is supplied to a focus control circuit 57 which derives from this focus error signal an energizing signal for an focus actuator 58 such that a focal point 59 of the beam 54 is maintained in a plane of the record carrier in which the optically detectably marks 3 are located. The detector 55 the circuit 56 the focus control circuit 57 and the focus actuator form a focus servo system of an usual type.

The tracking error signal RE is supplied to a tracking control circuit 59 which derives from the tracking error signal RE an energizing signal for a tracking actuator 60 arranged to move the beam 54 in radial direction in response to the energizing signal so as to maintain the beam substantially directed to the centre of the track 5. The detector 55, the circuit 56 and the tracking control circuit form a tracking servo system of usual type. The detection signals on the output of the detector are also supplied to an information recovery circuit 61

Further the playback apparatus is provided with scanning velocity control means for maintaining the scanning velocity at a substantially constant value. The scanning velocity control means may comprise a circuit 63, for example a phase locked loop circuit of an usual type, for recovering the data clock from the detection signals on the output of the detector 55. The frequency of the data clock is a measure for the scanning velocity. A signal indicating the data clock frequency is supplied to a motor control circuit 64 for energizing the motor 50 such that the frequency of the recovered data clock is maintained on a substantial constant value. It is to be noted that the scanning velocity servo system can also be realised in other manners, for example as often realized in compact disc players on the basis of the filling grade of a so-called FIFO-buffer in which the information read out is temporarily stored.

Figure 6:
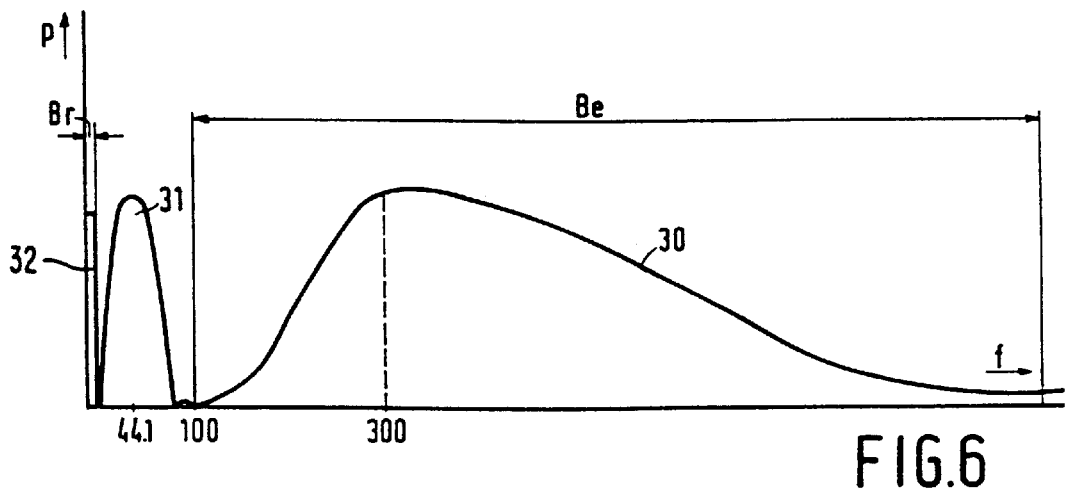

In the event that the record carrier 1 is of the type as shown in FIG. 1b the tracking error signal exhibit a signal component which is caused by the radial wobble. For a detailed explanation of this phenomena reference is made to EP-A-0,299,573 and EP-A-0,325,330 which documents herewith are incorporated in the description by reference. The frequency of the radial wobble should be selected such that the frequency of the signal component caused by the wobble is situated outside the bandwidth of the tracking servo loop and outside the frequency spectrum of the information. FIG. 6 shows as illustration the position of the frequency spectrum 31 of the signal component caused by the radial wobble situated between the bandwidth 32 of the tracking servo and the frequency spectrum 30 of the information recorded on the record carrier.

The signal component in the tracking error signal RE caused by the radial wobble is detected by a detection circuit 62. This detection circuit 62 may be of a type as disclosed in detail in the documents EP-A-0,299,573 and EP-A-0,325,330.

Figure 7:
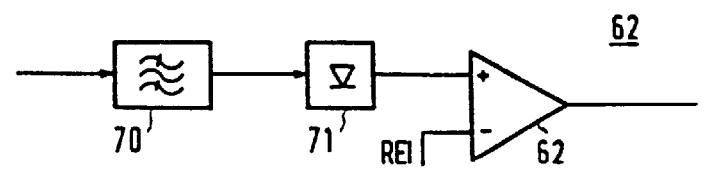

The radial wobble may be a wobble with a constant frequency and constant amplitude. In that case the detection circuit may be of a type as shown in FIG. 7. The detection circuit shown in FIG. 7 comprises a band pass filter 70 tuned to the frequency of the signal component caused by the radial wobble. The input of the band pass filter 70 is coupled to the circuit 56 so as to receive the tracking error signal RE. The output of the band filter 70 is coupled to an input of a rectifying circuit 71 for rectifying the signal component filtered out by the filter 70. The rectified signal component is supplied to a comparator 72 for comparing the rectified signal with a reference value REF.

In the event that the rectified component exceeds the reference value REF the comparator generates an enabling signal which is supplied to the information recovery circuit for enabling the recovery of the information from the detection signals on the output of the detector 55.

So only in the event that the detection circuit 61 detects a signal component of a predetermined frequency caused by the radial wobble the information recovery is enabled. In case of an absence of this component the information recovery is maintained disabled. This means that the information recorded on a record carrier without a radial wobble with said predetermined frequency cannot be recovered.

Instead of a radial wobble with a constant frequency and constant amplitude it is preferred to use radial wobbles which exhibit a modulation which represent a code. Such modulation may be of a type as for example as disclosed in EPA-0,299,573 or a FM-modulation as disclosed in EP-A-0,325,330.

Figure 8:
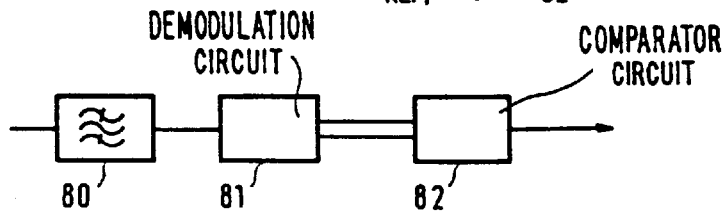

In the event that a modulated radial wobble is used the detection circuit 62 may be of a type as disclosed in the said EP-documents. FIG. 8 shows in principle such type of detection circuit 62. This detection circuit comprises a band pass filter 80 tuned to the frequency of the radial wobble. The input of the filter 80 is coupled to the circuit 56 so as to receive the tracking error signal RE. The output of the filter 80 is supplied to a demodulation circuit 81 for recovering the code represented by the modulated wobble. The code recovered by the demodulation circuit 81 is supplied to a comparator circuit 82 for comparing the code recovered with a predetermined code. The comparator circuit 82 is of a type that generates an enabling signal for the recovery circuit 61 in the event that the code recovered by the demodulation circuit 81 corresponds with the said predetermined code.

The information recovery circuit 61 may be of an usual type which may be enabled by means of an enabling signal.

Figure 9:
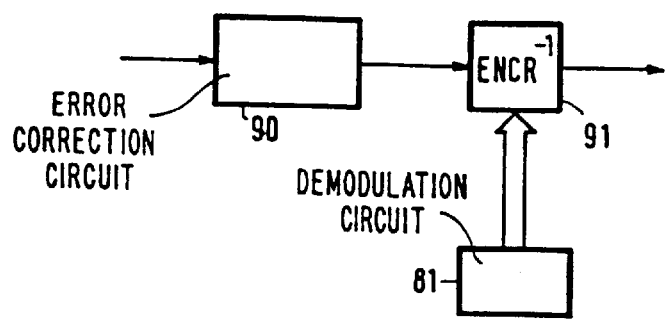
FIGS. 7, 8 and 9 show embodiments of detection circuits for use in the information system as shown in FIG. 5.

It may be preferably to record encrypted or scrambled information on the record carrier which can only be recovered using a predetermined encryption or descrambling key code. In that event it is preferred to represent the descrambling or encryption code by the modulation of the track wobble. The information recovery circuit should then provided with a descrambling or a de-encryption circuit for de-encrypt or descramble the information using the code directly received from the demodulation circuit 81. An example of such information recovery circuit is shown in FIG. 9, which information recovery circuit comprises a demodulation and error correction circuit 90 of an usual type for the recovery of information which has been encoded for example in accordance with a Compact Disc standard. The output signal of the circuit 90 is supplied to a descrambling or de-encryption circuit 91 of an usual type which descrambles or de-encrypts the information in conformity of the code directly received from the demodulation circuit 81.

For copying Compact Discs often a so-called recordable Compact Disc is used which is provided with a pregroove exhibiting a radial wobble which cause a signal component in the radial error signal with a frequency which substantially corresponds with a value of 22 kHz when the record carrier is scanned with a nominal scanning velocity of 1.2 to 1.4 meter per second. Said recordable Compact Disc is in detail disclosed in EP-A-0,325,330 already mentioned.

In order to prevent that a radial wobble can be copied from a Compact disc with a modulated radial wobble, it is preferred that the radial wobble on the compact Disc to be copied has a frequency which substantially corresponds with the frequency of the radial wobble of the pregroove on the recordable Compact Disc. In that case the frequency spectra of both wobbles overlap and the wobbles cannot be distinguished from one another any more.

The embodiments described in the preceding are suitable to be used in combination of record carriers which exhibit a track wobble as shown in FIG. 1b.

The same circuitry can be used in the event that a record carrier is used as shown in FIG. 1d. When using that type of record carrier a signal component in the focus error signal is caused in stead of in the tracking error signal. In that case the focus error signal should be supplied to the detection circuit 62 in stead of the tracking error signal RE.

In the event that a record carrier is used of a type as shown in FIG. 2 the frequency of the data clock recovered by circuit 63 exhibits variations. In that event a signal indicative of these variations in the data clock frequency should be supplied to the detection circuit 62.

The detector 55, the circuit 63, the motor circuit 64 and the motor 50 form a scanning velocity control system. For a proper operation the variations in the data clock frequency should be situated outside the bandwidth of the scanning velocity servo. In the preceding the invention is described for use in combination of optical information systems. However it is to be noted that in principle the invention is also applicable or other type of information systems such as magnetic information systems. In such systems a magnetic record carrier may be provided with a wobbling track. Both the magnetic information pattern and the track wobble can be detected by the same magnetic read head.

What is claimed is:

1. A playback apparatus for recovering information recorded on a record carrier, the record carrier exhibiting (i) first variations of a first physical parameter of the record carrier, said first variations corresponding to the recorded information, and (ii) also exhibiting, when provided therewith, second variations of a second physical parameter of the record carrier, the second physical parameter differing from the first physical parameter; said apparatus comprising:

a transducer for scanning the record carrier and outputting a detection signal, said detection signal having first variations in response to said first variations of said first parameter, said detection signal also having second variations in response to said second variations of said second parameter, said second variations of the detection signal having a frequency spectrum which is outside the frequency spectrum of said first variations of the detection signal;

recovery means coupled to said transducer and responsive to said first variations of the detection signal to recover the recorded information therefrom;

detection means also coupled to said transducer and responsive to said second variations of the detection signal to produce an output signal indicating whether the record carrier is provided with said second variations of said second parameter; and enabling means coupled to said detection means for enabling said recovery means to recover the recorded information only when the output signal of said detection means indicates that the record carrier is provided with said second variations of said second parameter.

2. A playback apparatus as claimed in claim 1, wherein said second variations exhibit a modulation pattern representing a code, said detection means includes demodulation means for recovering said code on the basis of at least one signal indicative of said second variations and originating from said transducer means, and the apparatus further comprises means for setting said recovery means in an operating mode in which a predetermined type of data processing indicated by said code is performed during recovery of the recorded information.

3. A playback apparatus for recovering information recorded on a record carrier, the record carrier exhibiting (i) first variations of a first physical parameter of the record carrier, said first variations corresponding to the recorded information, and (ii) also exhibiting, when provided therewith, second variations of a second physical parameter of the record carrier, the second physical parameter differing from the first physical parameter; said apparatus comprising:

a transducer for scanning the record carrier and outputting a detection signal having first variations in response to said first variations of said first parameter, said transducer also outputting a further detection signal having second variations in response to said second variations of said second parameter, the second variations of the further detection signal having a frequency spectrum which is substantially all outside the frequency spectrum of the detection signal having said first variations;

recovery means coupled to said transducer and responsive to the detection signal having said first variations to recover the recorded information therefrom;

detection means also coupled to said transducer and responsive to the detection signal having said second variations to produce an output signal indicating whether the record carrier is provided with said second variations of said second parameter; and disabling means coupled to said detection means for disabling said recovery means from recovering the recorded information when the output signal of said detection means indicates that the record carrier is not provided with said second variations of said second parameter.

4. A playback apparatus for recovering copy protected information recorded on a record carrier, the record carrier exhibiting (i) first variations of a first physical parameter of the record carrier, said first variations corresponding to the recorded information, and (ii) also exhibiting, when provided therewith, second variations of a second physical parameter of the record carrier, the second physical parameter differing from the first physical parameter; said apparatus comprising:

a transducer for scanning the record carrier and outputting a detection signal having first variations in response to said first variations of said first parameter, said transducer also outputting a further detection signal having second variations in response to said second variations of said second parameter, the second variations of the further detection signal having a frequency spectrum which is substantially all outside the frequency spectrum of the detection signal having said first variations;

recovery means coupled to said transducer and responsive to said first variations of the detection signal to recover the recorded information therefrom;

detection means also coupled to said transducer and responsive to said second variations of the detection signal to produce an output signal indicating whether the record carrier is provided with said second variations of said second parameter; and disabling means coupled to said detection means for preventing said recovery means from recovering the recorded information when the output signal of said detection means indicates that the record carrier is provided with a type of said second variations signifying that said record carrier is recordable and therefore is not copy protected.

5. Playback apparatus as claimed in claim 4, wherein said type of second variations of a recordable record carrier is a wobble of a recording track thereof.

6. Playback apparatus as claimed in claim 5, wherein the frequency spectrum of said second variations is substantially in the vicinity of 22 kHz.

* * * * *